United States Patent [19]

Blasquez-Gonzales et al.

[11] Patent Number: 4,838,920
[45] Date of Patent: Jun. 13, 1989

[54] METHOD OF AND APPARATUS FOR POSITIONING OF SHEETS OF GLASS FOR CURVING SAME

[75] Inventors: Ignacio Blasquez-Gonzales, Tarragone, Spain; Rene Blanchard, Aniche, France; Bernard Letemps, Thourotte, France; Denis Mathivat, Thourotte, France; Philippe Boutier, Thourotte, France

[73] Assignee: Saint-Gobain Vitrage, Paris, France

[21] Appl. No.: 117,514

[22] Filed: Nov. 6, 1987

[30] Foreign Application Priority Data

Nov. 6, 1986 [FR] France ............................. 86 15488

[51] Int. Cl.⁴ ............................................. C03B 35/16
[52] U.S. Cl. ...................................... 65/104; 65/106; 65/107; 65/160; 65/273
[58] Field of Search ................. 65/107, 104, 106, 160, 65/273

[56] References Cited

U.S. PATENT DOCUMENTS

| | | | |
|---|---|---|---|
| 4,204,854 | 5/1980 | McMaster et al. | 65/106 |
| 4,222,764 | 9/1980 | Revells et al. | 65/374.13 |
| 4,298,368 | 11/1981 | Seymour | 65/273 X |
| 4,305,746 | 12/1981 | Hagedorn et al. | 65/273 X |
| 4,475,937 | 10/1984 | Nitschke | 65/273 |
| 4,632,688 | 12/1986 | Rahrig et al. | 65/160 X |
| 4,634,329 | 1/1987 | Diederen et al. | 65/106 |

Primary Examiner—Arthur Kellogg
Attorney, Agent, or Firm—Oblon, Fisher, Spivak, McClelland & Maier

[57] ABSTRACT

The invention relates to the precise positioning of sheets of glass on a conveyer, particularly in an installation for curving sheets of glass. Positioning the sheets of glass by means of a combination of actions, in whole or in part, comprising orientations, longitudinal centerings and transversal centerings.

11 Claims, 3 Drawing Sheets

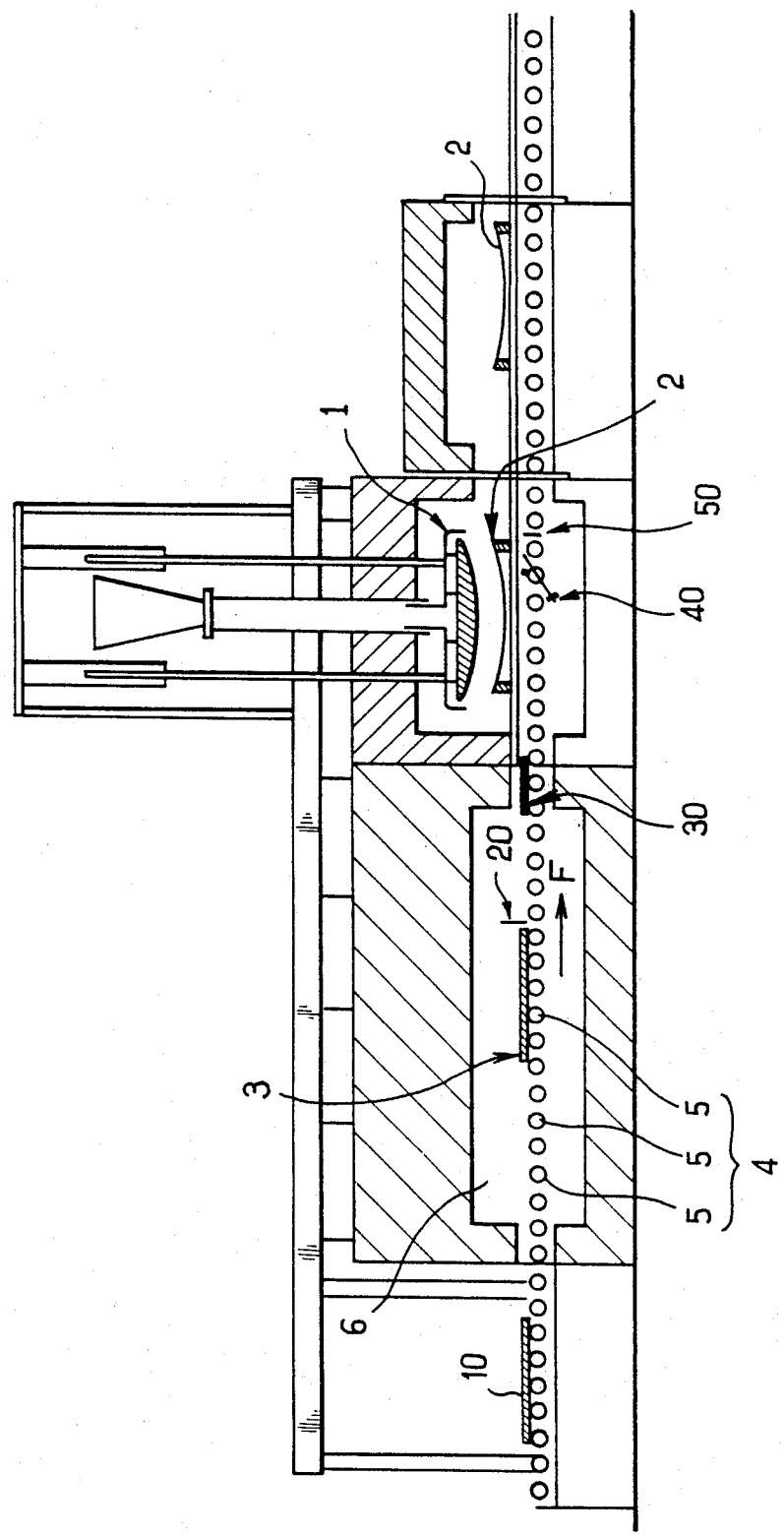
FIG_1

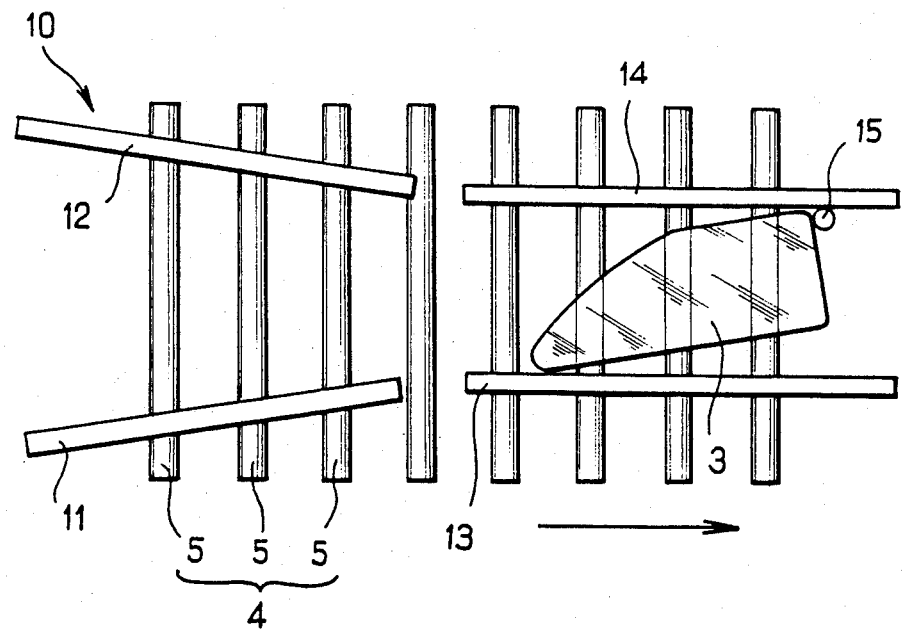
FIG_2
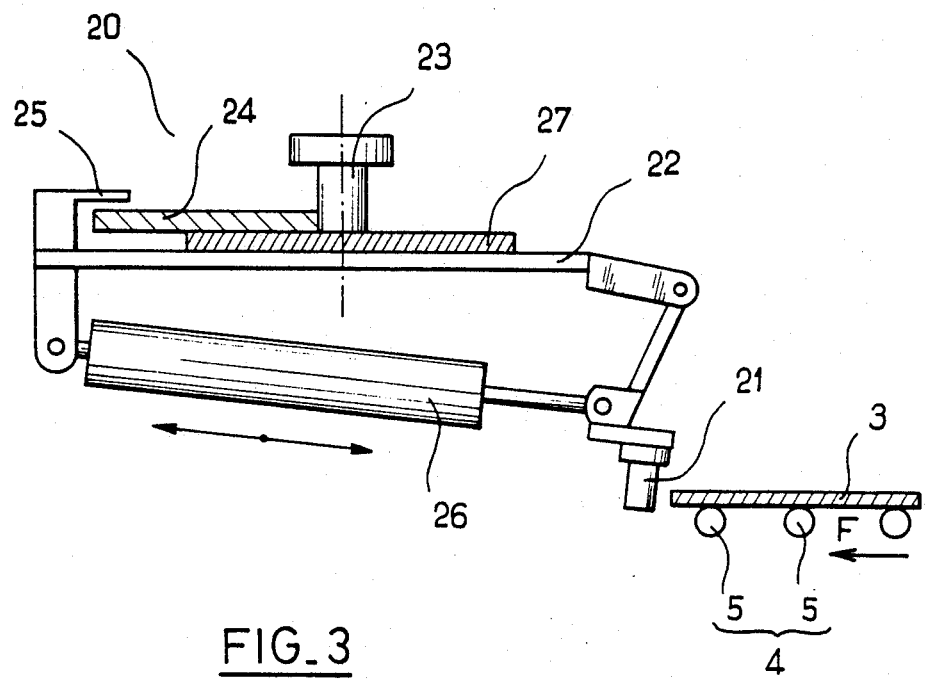
FIG_3

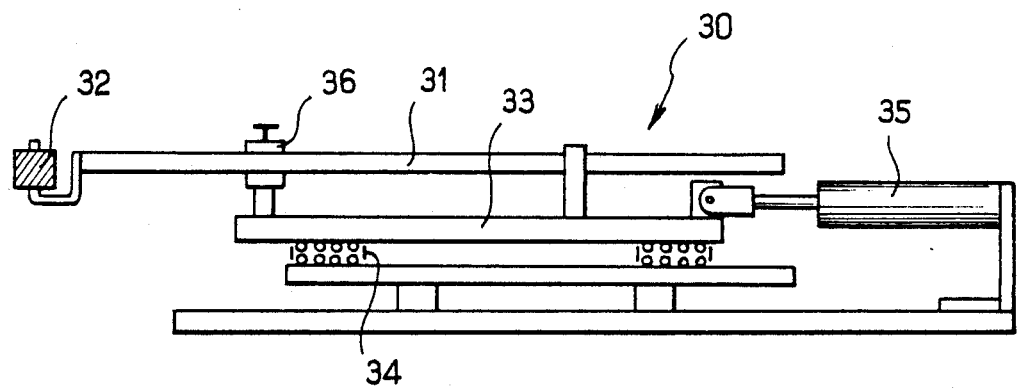
FIG_4
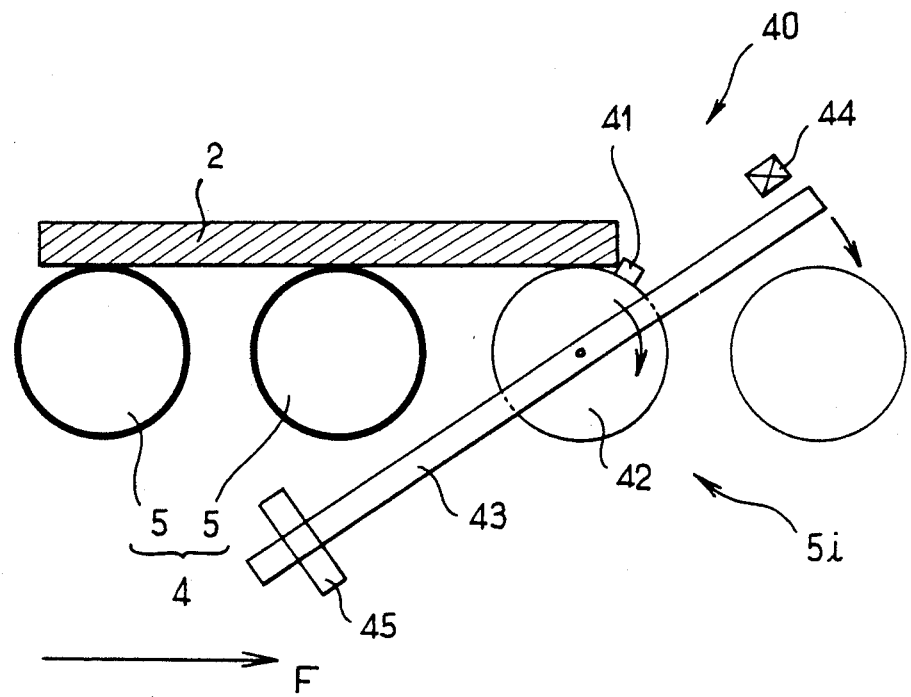
FIG_5

METHOD OF AND APPARATUS FOR POSITIONING OF SHEETS OF GLASS FOR CURVING SAME

BACKGROUND OF THE INVENTION

1. Field of the Invention

The invention relates to the positioning of glass sheets which are passing flat on a conveyer, with a view toward curving them.

2. Background of the Prior Art

In order to be able to provide correctly curved sheets of glass, it is first important for said sheets of glass to be correctly positioned in relation to the curving equipment. This is general and relates to all curving techniques, but must particularly be respected when the curving technique is used in accordance with the method in which the sheets of glass are supplied against an upper component, which is gnerally shaped, whose profile they adopt, in order to be subsequently released, possibly onto a complementary lower curving component arranged beneath the upper component, on which the shaping of the sheets of glass is carried out or is continued.

In order for the curvature taken by the sheets of glass to be correct, it is important to position them in a precise manner in relation to the upper component and possibly also in relation to the complementary lower curving component.

In addition, in order to increase manufacturing capabilities, several sheets of glass need to be treated simultaneously and, in that case, it is important not only to correctly position the sheets of glass in relation to the curving equipment, but also in relation to each other.

It is known to correctly orient sheets of glass prior to their being placed into a reheating furnace to curve them, for example by manual action or by guiding their lateral edge with a guide bar which is correctly oriented and is arranged along the furnace conveyer.

It is also known to use optical means for detection of the front edge of the sheets of glass combined with the movement of the conveyer, which can therefore cause the stoppage of the sheets of glass when they arrive under the possibly shaped upper component or components against which they will be subsequently applied.

However, these positioning means are insufficient and inexact. In effect, during its transport along the reheating furnace, a sheet of glass slides to some degree on the conveyer belt and the adjustment of position which is made at the entry is no longer necessarily appropriate on arrival under the curving equipment.

Moreover the adjustments in position made on the cold glass do not always remain valid on hot glass which could have become deformed.

In addition, stopping the glass with electronically relayed optical detectors in hot atmospheres is not sufficiently precise and does not in all cases provide accuracy on the order of that which is presently required, i.e., on the order of 1/10 mm.

SUMMARY OF THE INVENTION

The present invention seeks to provide means which provide for precise positioning of the glass sheets on a conveyer, particularly with regard to curving equipment.

To do this, it proposes a method for positioning glass sheets comprising a combination of all or part of the following steps:

orientation of the sheets of glass prior to their entry into the reheating furnace by retaining said sheets while the conveyer continues to operate using at least one retractable abutment at least until the sheets take support on two lateral guide bars arranged substantially in the direction of the conveyer and on each side of the path of the sheets of glass, orientation of the sheets of glass by abutment of the front edge of said sheets against a retractable paddle, whose position can be adjusted and which is arranged across the conveyer, said paddle holding the sheets of glass while the conveyer continues to advance them so as to force them to align their front edge in relation to said paddle, lateral thrust of the sheets of glass by pushers acting substantially perpendicular to the forward movement of the conveyer, stopping of the sheets of glass with an adjustable delay by stopping the conveyer after the glass encounters a retractable finger on one roller of the conveyer as is known from French Pat. No. 85.13801, precise stopping of the sheets of glass against abutments which are part of the curving equipment or the general housing.

In a preferable embodiment, it comprises orienting the sheets of glass using a paddle in the reheating furnace at a moment when said sheets have a homogeneous temperature, which, however, is sufficiently low to minimize the risks of sticking onto the rollers of the conveyer.

It preferably comprises supporting the sheets of glass during this orientation operation, using rollers covered with sheets of woven or knitted silica or glass threads.

BRIEF DESCRIPTION OF THE DRAWINGS

The invention will now be described in more detail referring to the attached drawings which represent:

FIG. 1: An overall view of a curving installation using upper and lower curving components, FIG. 2: A schematic view of an orientation means using retractable abutment and lateral guiding of the sheets of glass, FIG. 3: A schematic view of an orientation means using a retractable paddle arranged across the conveyer, FIG. 4: A schematic view of the lateral pushers, FIG. 5: A schematic view of a means for stopping the sheets of glass comprising a detector finger capable of being tipped by the sheets of glass and causing, by means of electronic means, the conveyer to stop.

DETAILED DESCRIPTION OF THE INVENTION

FIG. 1 is a schematic view of an installation for curving sheets of glass with curving equipment composed of an upper component 1 and a lower component 2.

In such an installation, sheets of glass 3 to be curved, arrive flat on a conveyer 4, for example with rollers 5, after having been reheated to a curving and tempering temperature in a furnace 6. They stop under upper component 1, are taken up by this component 1 or are applied thereagainst, for example using an ascending current of hot air as described in the European patent document published under No. 169 770. This upper component 1 can be a simple means for transferring the glass with a view to subsequently depositing it on the lower component 2 which, in this case, is a component with a curved profile, for example a curving frame which is open at the center.

This upper component 2 can alternatively be a component with a curved profile, so as to provide either precurving of the glass, since said glass is then deposited onto lower component 2 which is therefore the final and definitive curving component, or total and definitive curving of the glass, with lower component 2 in such case being only a means for removal of the curved glass from the curving station.

In order to precisely position the glass 3 in relation to the curving means, various positioning means can be used: means generally referenced 10 which are essentially composed of lateral guides for the glass 3, shown on FIG. 2 and arranged upstream of the furnace 6, means generally referenced 20, composed essentially of a paddle across the conveyer and arranged inside the furnace 6, shown on FIG. 3, lateral pushers generally referenced 30, means referenced 40, composed essentially of a retractable detector finger carried by one roller of the conveyer, arranged in the curving chamber and shown on FIG. 4, means referenced 50 composed of abutments associated with the curving equipment.

The positioning means 10 shown in FIG. 2 essentially comprise guide bars 11, 12, 13, 14, which are arranged laterally in relation to the path of the conveyer 4, and a retractable abutment for stopping the sheets of glass 3, which is arranged in proximity to the most downstream guide bar, for example guide bar 14. This abutment retracts, for example, under the action of a jack which is not shown. Guide bars 11 and 12, which are arranged the most upstream position, surround the conveyer and define a passage for the sheets of glass 3 which passage, as it progresses in the direction of forward movement of the conveyer defined by arrow F, becomes progressively narrower.

These two guide bars 11 and 12 are extended by the two guide bars 13 and 14, which are slightly or are not sloped in relation to the direction of forward movement of the conveyer. The adjustable separation of said guide bars depending on each model of glass sheet corresponds to the space occupied widthwise by the sheets of glass when they have the desired orientation.

In order to confer said desired orientation on these sheets of glass, abutment 15 is placed in the active position, that is that a sheet of glass 3 arriving on the conveyer 4 necessarily hits it with one end of its front edge. Rollers 5 of conveyer 4 continue to be driven and the sheet of glass will be oriented until its corner opposite the one blocked by abutment 15 touches guide bar 13 opposite guide bar 14 in proximity of which abutment 15 is arranged. Since the desired orientation of the sheet of glass 3 has been achieved, abutment 15 is retracted and the sheet of glass continues its path on the conveyer 4.

It is possible during this stop phase of the sheet of glass for operations to be carried out which are independent of the curving, for example marking of the glass using serigraphy, etc.

The correctly oriented sheet of glass then enters the reheating furnace 6.

Inside furnace 6 the sheet of glass encounters the positioning means 20. This means can be complementary to the previously described means 10; it can verify the previously achieved orientation of the glass or adjust it should it have been lost, for example due to sliding on the rollers 5 of the conveyer 4. It can also replace previously described means 10. It can be estimated that it is more efficient when arranged further downstream in the installation. As shown in FIG. 3, this means 20 is composed essentially of a paddle 21 or a plurality of fingers, such as 21, mounted on a same support bar 22 which is arranged above the conveyer 4, such that, in the active position, the fingers or paddle 21 can stop a sheet of glass carried by said conveyer. The position of the fingers or of the paddle 21 is adjustable on bar 22, such that they are sure to intercept the sheet of glass. The bar 22 is arranged across the conveyer 4 and its orientation in relation to the direction of forward movement of said conveyer is adjustable by rotation of the assembly along a vertical axis 23, with the reading of the position of the system being provided by a reference mark 24 on a dial 25.

The placing in the active position or, to the contrary, the retraction of the fingers 21 is carried out by a jack 26. The entire mechanism is carried by a plate 27 which is connected by support flanges, which are not shown, to the general housing of the installation.

Means 20 is arranged inside the furnace at a location where the sheet of glass has already reached a homogeneous temperature but which, however, is sufficiently close to the entry of the furnace for the temperature of the glass not to be too high, thus preventing the glass from sticking to rollers 5 while the glass is being held by the fingers 21. This means 20 is preferably arranged in an area which is between halfway and two-thirds of the length of the furnace from the entry, at a place where the temperature of the glass is on the order of 450° to 575° C., preferably on the order of 475° to 550° C. and most preferably around 500° C. for glass which has received no coating or treatment and is approximately 3 or 4 mm in thickness. This temperature varies slightly depending on the weight and sizes of the sheets of glass, depending on possible prior treatments of the glass and depending on the possible necessity of providing several means such as 20 in the same furnace, particularly with a view to positioning and separating several sheets of glass intended to be curved in a same step using an upper component for curving and/or transferring to several locations capable of simultaneously curving several sheets of glass.

Preferably, in an attempt to prevent this sticking of the glass to rollers 5 of the conveyer 4, said rollers are covered with a woven or knitted sheath in glass or silica threads.

Means 20 operates in the following manner: a sheet of glass 3 arriving on the conveyer 4 is stopped by its front edge meeting the fingers or the paddle 21. Bar 22 supporting the fingers or the paddle 21 has previously been oriented in relation to the axis of the conveyer 4 so that the sheets of glass abutting against the fingers of the paddle 21, while continuing to be driven by rollers 5, take on the desired orientation which is compatible with the curving equipment to which they will be subsequently subjected. The desired position of the sheets of glass abutting against the fingers or the paddle 21 can be marked by detectors, not shown, which control the activation of the retraction jack 26 when said sheets of glass have excited said detectors. In accordance with an alternative embodiment, the retraction jack 26 can be activated to release the sheets of glass after an adjustable time, which is determined by a few tests on sheets of glass of the model in question and which is sufficient for the orientation of said sheets of glass to be certain to have had time to occur.

Several means such as 20 can be arranged one after the other, with each means capable of acting on all the sheets of glass or with each means being intended to act only on certain sheets of glass and therefore allowing others to pass. Thus, in the case already cited, where an upper component for curving and/or transferring the glass sheets to several juxtaposed locations in the direction of forward movement is used, it is important to orient and position each sheet of glass, but also to separate from one another the sheets of glass intended to be curved at the same time by a distance which is adapted to the position of the curving locations on the upper curving and/or transfer component.

Since the fingers or the paddle 21 have been retracted, the correctly oriented sheet of glass continues its path in the furnace before arriving at the shaping chamber.

On its path, it is subjected to the action of other centering means, particularly to the action of means 30 which are essentially composed of lateral pushers. These means 30 are shown on FIG. 4. They comprise arms such as 31 ending with rollers such as 32, which are of a heat-resistant material not damaging to the glass, mounted on a platform 33, arranged laterally in relation to conveyer and directed along a direction which is approximately perpendicular to the direction of movement of the conveyer. Platform 33 is mounted on bearings 34 and is connected to the end of the stem of a jack 35 which is attached to the general housing, so as to be able to move in the direction of the conveyer or, to the contrary, to recede. The extension of each arm 31 can be adjusted by sliding the stems which comprise said arms into sliders 36 which are fixed onto platform 33. The extension can be adjusted differently for each arm.

This assembly 30 is preferably mounted on rails, which are not shown and which are parallel to the conveyer, and it is driven, when it is in action, at the speed of the conveyer.

This assembly is controlled automatically. Its operating time is adjustable and depends on the model of the glass and the distance which it is desired to push said glass in the transversal direction in relation to the conveyer.

With the operating time having been determined by a few prior tests, this assembly is acted on by a sheet of glass approaching on the conveyer. The approach of the sheet of glass can be signaled by an optical detector which sets this assembly 30 in operation. Jack 36 then pushes the platform 33 and, with it, arms 31. The rollers come into contact with the sheet of glass and push it in the transversal direction in relation to the conveyer. The pushing time is determined such that at the end thereof the sheet of glass is in the desired position.

This assembly can be associated with hot air blowing under the sheet of glass, which takes up only part of the weight of the sheet of glass, and provides relief in part to the rollers 5 of the conveyer, which assists the sliding of the sheet of glass, without deteriorating its surface due to friction on the rollers. This assembly 30 can, for example, be arranged immediately at the exit from the furnace 6 for reheating the glass.

The sheets of glass which are correctly oriented in relation to the axis of conveyer 4 and are correctly centered in the transversal direction, particularly due to the action of pushers 30, then encounter device 40 which is illustrated in FIG. 4 and is already known and described in French Patent Application 85.13801.

Only a brief description of this known device will be repeated below. This device 40 is formed by at least one detector finger 41 projecting above the plane of the conveyer along which the sheets of glass are transported. This finger 41 is carried by a stem 42 which is parallel to the rollers 5 of the conveyer and, in a preferred embodiment, it is actually a non-driven roller 5 of the conveyer.

When the front edge of a sheet of glass encounters a finger 41, it pushes it back and at the same time causes the rotation of the stem or roller 42, which has the effect of retracting finger 41 and freeing the passage for the sheet of glass. However, one of the ends of stem 42 is connected to a lever arm 43 which, when the finger 41 is in the active position, rests on a proximity detector or micro-contact 44. When finger 41 is touched by the sheet of glass, its position in the forward movement direction of the conveyer is precisely determined and the stopping of the conveyer is controlled with a more or less large adjustable delay after said contact with finger 41 concomitant with the detachment of the lever arm in relation to the micro-contact 44.

It is thus possible to stop the sheets of glass in a precise position, at a short distance after the detector finger 41.

A counterweight 45 for recalling the stem or the roller 42 to the active position is provided at the end of lever 43.

For even greater accuracy, means 50 can further be provided, which are essentially composed of abutments which are connected to the curving equipment or to the installation housing and which are capable of coming into contact with the front edge of the sheets of glass when they arrive on the conveyer 4. These abutments can also be composed of optical detectors which are capable of detecting the front edge of the sheets of glass.

The precise positioning of the sheets of glass opposite the curving equipment necessitates the use of at least two of the above-described means, and preferably more than two.

This precise positioning allows very tight tolerances to be observed, even when producing curved glasses with very complex uneven shapes and high cambers. This precise positioning which is described in relation to curving using upper and/or lower curving components can also be used to advantage for other techniques for curving glass circulating flat on a conveyer, or for other operations independent of curving, for example marking.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method for positioning glass sheets passing flat on a conveyer from a point upstream of a reheating furnace means to means for curving said glass sheets, all within a housing means, comprising a combination of at least two of the following steps:
   orientation of the sheets of glass prior to their entry into said reheating furnace by retaining said sheets while the conveyer continues to operate using at least one retractable abutment at least until the sheets take support on two opposed lateral guide bars arranged substantially in the direction of the conveyer and on each side of the path of the sheets of glass, orientation of the sheets of glass by abutment of the leading edge of said sheets against a retractable paddle or fingers, whose position can be adjusted and which is arranged across the conveyer, said paddle or said fingers holding the sheets of glass while the conveyer continues to advance them so as to force them to align their front edge in relation to said paddle or said fingers, lateral thrust of the sheets of glass by pushing means acting substantially perpendicular to the direction of forward movement of the conveyer, stopping of the sheets of glass with an adjustable delay by stopping the conveyer after the glass encounters a retractable finger on one roller of the conveyer in a known manner, and precise stopping of the sheets of glass against abutments downstream of said pushing means, retractable finger and furnace means which are part of the curving means or the housing means.

precise stopping of the sheets of glass against abutments which are part of the curving equipment or the general housing.

2. The method for positioning sheets of glass in accordance with claim 1, wherein in that it comprises at least two actions, one constituting positioning in the longitudinal direction of forward movement of the conveyer, the other constituting a positioning in the transversal direction.

3. The method in accordance with claim 1 wherein the action of orientation of the sheets of glass using a retractable paddle or fingers arranged across the conveyer takes place in the reheating furnace which precedes the curving station at a moment when the sheets of glass have a homogeneous temperature but which is sufficiently low to minimize sticking onto the rollers of the conveyer.

4. The method in accordance with claim 3, wherein the glass is at a temperature of between approximately 450° and 575° C.

5. The method in accordance with one of claims 3, wherein the glass is transported on rollers covered with a sheath in woven or knitted glass or silica threads.

6. A device for positioning sheets of glass passing flat on a conveyer comprising at least two of the following means:

orientation means arranged upstream of the glass reheating furnace for tempering comprising guide bars which are lateral in relation to the path of the conveyer and at least one stop abutment for the glass which is located in proximity to one of the guide bars, orientation means comprising a retractable paddle or retractable fingers mounted on a bar arranged across the conveyer and which are capable of retaining the sheets of glass while the conveyer continues to operate, requiring said sheets of glass to align their front edge in accordance with the fingers or the paddle, lateral pusher means acting on the sheets of glass in a direction substantially perpendicular to the direction of forward movement of the conveyer, a detector finger carried by a stem or a free roller in rotation, which is parallel to the rollers of the conveyer and is retractable by rotation of the stem or the roller under the thrust of the glass, associated with a lever arm which is in contact with a microcontact when the detector finger is in the active position in projection above the plane of the conveyer, said micro-contact being coupled to the drive of the conveyer and interrupting same with an adjustable delay when the lever arm has left said drive following pivoting of the detector finger by the glass, abutments perpendicular to the curving equipment and part of said equipment or the housing.

7. The device in accordance with claim 6, wherein said orientation means with fingers or a paddle are placed in the furnace, at approximately two-thirds of its length from the entry, in an area where the glass is at a temperature of between 450° and 575° C.

8. The device in accordance with one of claim 6, wherein the rollers of the conveyer for transporting the sheets of glass are covered with sheaths of woven or knitted glass or silica threads.

9. The device in accordance with one of claim 6, further comprising means for blowing of hot air capable of only supporting a portion of the weight of the sheets of glass in connection with the lateral pushers.

10. The device of claim 6 for the positioning of sheets of glass in a curving installation having an upper transfer or curving component and a lower transfer or curving components, with the sheets of glass first being applied against the upper component and then released onto the lower component.

11. Method of claim 1, wherein said sheets of glass are conveyed to a station for bending.

* * * * *